(12) United States Patent
Dickson

(10) Patent No.: US 11,752,366 B2
(45) Date of Patent: *Sep. 12, 2023

(54) HEAT RESISTANT DESCENT CONTROLLER

(71) Applicant: Tech Safety Lines, Inc., Carrollton, TX (US)

(72) Inventor: Johnny Dickson, Van Alstyne, TX (US)

(73) Assignee: Tech Safety Lines, Inc., Carrollton, TX (US)

( * ) Notice: Subject to any disclaimer, the term of this patent is extended or adjusted under 35 U.S.C. 154(b) by 72 days.

This patent is subject to a terminal disclaimer.

(21) Appl. No.: 17/174,928

(22) Filed: Feb. 12, 2021

(65) Prior Publication Data

US 2021/0196991 A1    Jul. 1, 2021

Related U.S. Application Data

(63) Continuation of application No. 16/850,556, filed on Apr. 16, 2020, now Pat. No. 10,918,892, and a continuation-in-part of application No. 29/709,730, filed on Oct. 16, 2019, now Pat. No. Des. 957,742, and a continuation-in-part of application No. 29/709,731, filed on Oct. 16, 2019, now Pat. No. Des.
(Continued)

(51) Int. Cl.
*A62B 1/14* (2006.01)
*F16D 63/00* (2006.01)

(52) U.S. Cl.
CPC .............. *A62B 1/14* (2013.01); *F16D 63/008* (2013.01)

(58) Field of Classification Search
CPC .......... F16D 63/008; A62B 1/14; A62B 1/00; A62B 1/06; A62B 1/08
See application file for complete search history.

(56) References Cited

U.S. PATENT DOCUMENTS

| 263,775 A | 9/1882 | Emmert |
|---|---|---|
| 300,857 A | 6/1884 | Evans |

(Continued)

FOREIGN PATENT DOCUMENTS

| CA | 771509 A | 11/1967 |
|---|---|---|
| CN | 102548349 A | 7/2012 |

(Continued)

OTHER PUBLICATIONS

Instagram, "Highnovate", first available Jan. 1, 2021. (https://www.instagram.com/p/CJgf5BJhKi_I) (Year: 2021).
(Continued)

*Primary Examiner* — Pamela Rodriguez
(74) *Attorney, Agent, or Firm* — Vincent J. Allen; Rouel F. Rothenberger, IV; Carstens, Allen & Gourley, LLP

(57) ABSTRACT

A load lowering descent controller having a fixed cylindrical body or capstan about which a rope or cable is turned. The descent controller allows for lowering of the load at a controlled rate by adjusting the amount of friction between the controller and the rope or cable as a function of rope or cable turning and relative contact with rope or cable engagement surfaces in the controller. The fixed cylindrical body or capstan is surrounded by a vented sleeve to prevent the rope from becoming heated and to prevent the user from being injured.

20 Claims, 12 Drawing Sheets

Related U.S. Application Data 957,743, and a continuation-in-part of application No. 29/709,729, filed on Oct. 16, 2019, now Pat. No. Des. 933,308.

(60) Provisional application No. 62/834,782, filed on Apr. 16, 2019.

(56) References Cited

U.S. PATENT DOCUMENTS

| | | | |
|---|---|---|---|
| D28,992 S | 7/1898 | Eldon | |
| 3,335,469 A | 8/1967 | Shand et al. | |
| 3,949,832 A | 4/1976 | Hunter | |
| 4,040,627 A | 8/1977 | Useldinger | |
| 4,474,262 A | 10/1984 | Himmelrich | |
| 4,508,193 A | 4/1985 | Forrest | |
| 4,576,248 A | 3/1986 | Marom | |
| 4,651,351 A | 3/1987 | Endo et al. | |
| 4,883,146 A | 11/1989 | Varner et al. | |
| 5,038,888 A | 8/1991 | Varner et al. | |
| 5,090,503 A | 2/1992 | Bell | |
| 5,131,491 A | 7/1992 | Varner et al. | |
| D385,936 S | 11/1997 | Nakazaki | |
| 5,738,046 A | 4/1998 | Williams et al. | |
| 5,848,667 A | 12/1998 | Davidson | |
| D422,200 S | 4/2000 | Maruyama | |
| 6,800,007 B2 | 10/2004 | Calkin | |
| 6,814,185 B1 | 11/2004 | Ostrobrod | |
| 7,036,628 B2 | 5/2006 | Wilcox et al. | |
| 7,131,515 B2 | 11/2006 | Gartsbeyn et al. | |
| D533,813 S | 12/2006 | Fujiwara et al. | |
| 7,650,717 B2 | 1/2010 | Drayer | |
| D616,950 S | 6/2010 | Hersee et al. | |
| 7,942,241 B2 | 5/2011 | Botti et al. | |
| 8,353,386 B2 | 1/2013 | Helms | |
| 9,320,925 B2 | 4/2016 | Wise | |
| 9,643,034 B2 | 5/2017 | Wise | |
| D854,395 S | 7/2019 | Meyer et al. | |
| 10,918,892 B2 * | 2/2021 | Dickson | A62B 1/14 |
| 2003/0057018 A1 | 3/2003 | Dodson et al. | |
| 2003/0057023 A1 | 3/2003 | Gartsbeyn et al. | |
| 2004/0231923 A1 | 11/2004 | Gartsbeyn et al. | |
| 2005/0230184 A1 | 10/2005 | Ansaldo | |
| 2006/0113147 A1 | 6/2006 | Harris et al. | |
| 2007/0007266 A1 | 1/2007 | Sasaki et al. | |
| 2007/0272484 A1 | 11/2007 | Helms | |
| 2010/0051381 A1 | 3/2010 | Wydner et al. | |
| 2020/0330799 A1 | 10/2020 | Dickson | |

FOREIGN PATENT DOCUMENTS

| | | |
|---|---|---|
| CN | 102721020 A | 10/2012 |
| CN | 102247663 B | 6/2013 |
| CN | 203631161 U | 6/2014 |
| EP | 3159047 A1 | 4/2017 |

OTHER PUBLICATIONS

Open Tip, "Sky Genie DS-L Descender Sky Genie", First accessed Feb. 23, 2021. (https://www.opentip.com/Sky-Genie-DS-L-Descender-Sky-Genie-p-4180457.html?ad=rc_related) (Year: 2021).

Tech Safety Lines, "SRK-15", first accessed Feb. 23, 2021. (https://www.techsafetylines.com/app/uploads/2019/12/TSL_SRK-15_Globai-Kit.pdf) (Year: 2021).

Youtube, "Tech Safety Lines' Aerial Platform (MEWP) Rescue Solutions", first available Apr. 18, 2019. (https://www.youtube.com/watch?v=PFYbeU3DBXw&feature=emb_title) (Year: 2019).

\* cited by examiner

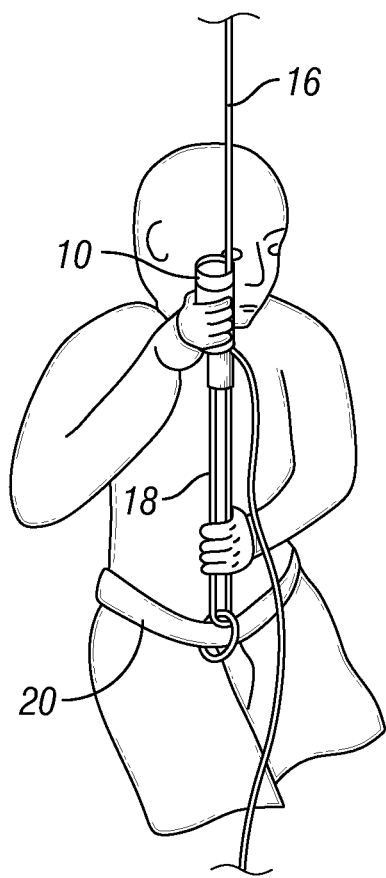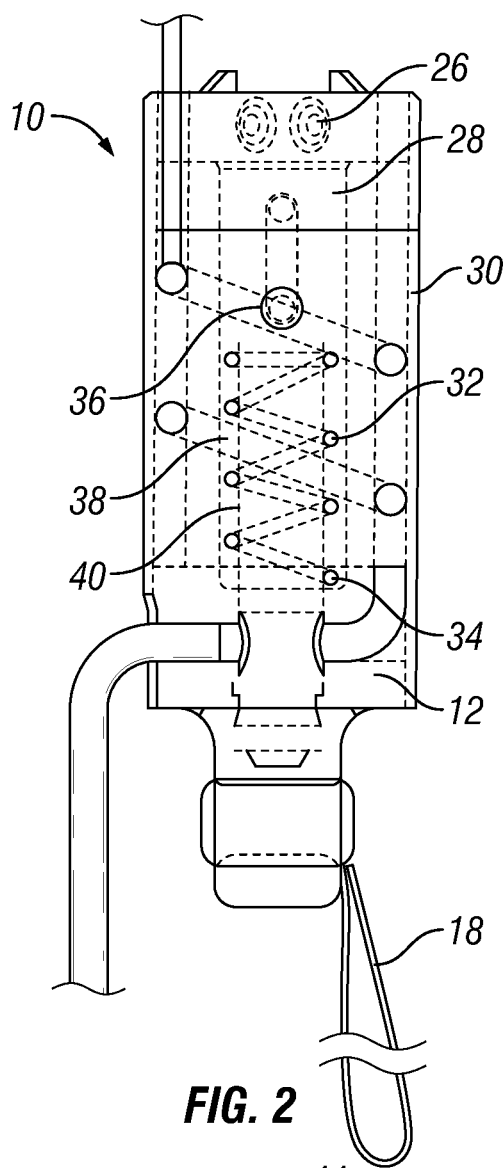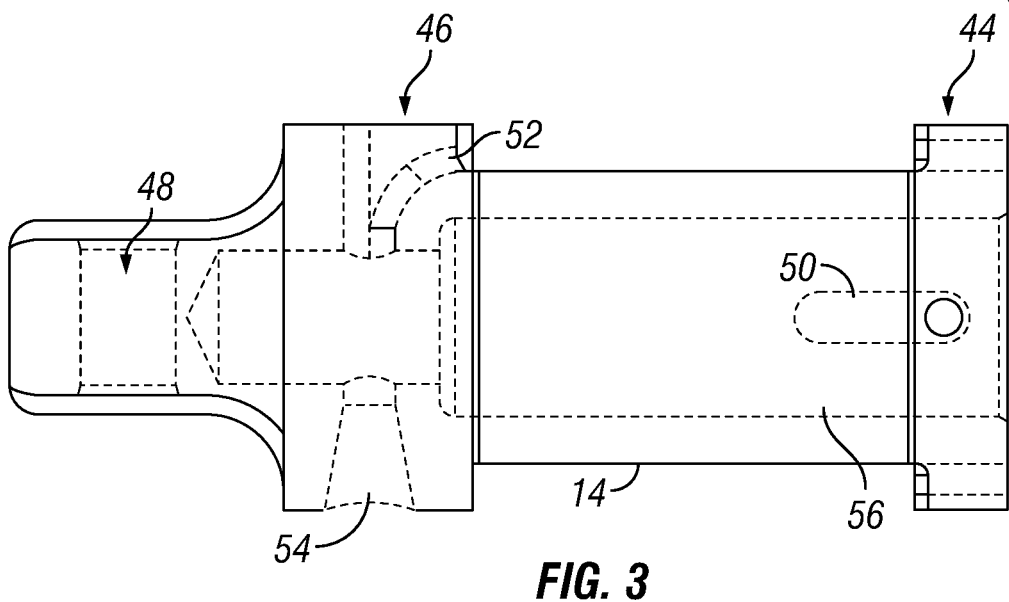
FIG. 1
FIG. 2
FIG. 3

HEAT RESISTANT DESCENT CONTROLLER

CROSS-REFERENCE TO RELATED APPLICATION

Applicant incorporates herein by reference U.S. Pat. No. 7,131,515 B2; U.S. application Ser. No. 10/251,090; and U.S. Provisional Patent Application No. 60/324,756. This disclosure a continuation of U.S. application Ser. No. 16/850,556 filed on Apr. 16, 2020, now U.S. Pat. No. 10,918,892 issued Feb. 16, 2021; which is a non-provisional of U.S. Design patent Application Nos. 29/709,731, 29/709,729 and 29/709,730 filed on Oct. 16, 2019 and a non-provisional conversion of U.S. Provisional Patent Application Ser. No. 62/834,782, filed Apr. 16, 2019, the entirety of which is incorporated herein by reference in its entirety for all purposes.

BACKGROUND

Technical Field

The present disclosure relates to a descent controller. More particularly, and not by way of limitation, the present disclosure is directed to an apparatus, system and method for a heat resistant descent controller.

BACKGROUND

This background section is intended to provide a discussion of related aspects of the art that could be helpful to understanding the embodiments discussed in this disclosure. It is not intended that anything contained herein be an admission of what is or is not prior art, and accordingly, this section should be considered in that light.

Descent assistance devices have been used for many years to aid in the lowering of a user or a load from a higher elevation to a lower elevation. These devices have taken many different forms and utilized various elements to provide a mechanical advantage and/or braking in order to control the descent of the user or load. Concerns with occupational safety have led to the development of mechanisms that enable a worker to lower himself from an elevated position such as a scaffold, crane, lift truck or platform in the event of an emergency such as a fire or fall.

As newly constructed buildings continue to increase in height, and the density of buildings increase, the length of rope to support a user or load also increases. One problem that arises with longer rope deployments is the heat that is generated in the descent controller device upon descent of a desired distance by a user. As a user brakes and/or controls his or her descent, the descent controller and rope individually and together generate significant heat. In some cases, the heat generated can exceed 300° F. As heat is generated, coatings and rope materials such as wax, and/or nylon begin to melt causing a buildup of this material within the descent controller. The buildup can cause additional heat to be generated from the material to material contact (wax on wax contact) that generates increased friction and heat.

It would be advantageous to have a descent controller that overcomes the disadvantages of the prior art.

BRIEF SUMMARY

This summary provides a discussion of aspects of certain embodiments of the invention. It is not intended to limit the claimed invention or any of the terms in the claims. The summary provides some aspects but there are aspects and embodiments of the invention that are not discussed here.

It is an object of the present disclosure to provide a new and improved load lowering descent controller of the type embodying a fixed cylindrical body or capstan about which a rope or cable is turned. Another object of the present disclosure is to provide a descent controller of the foregoing character that may be actuated for lowering a load such as an unconscious user or equipment. A further object of the present disclosure is to provide a descent controller of the foregoing character having a compact and robust design. Still another object of the present disclosure is to provide a descent controller wherein the operating components are substantially enclosed with a vented sleeve. A further object of the present disclosure is to provide a descent controller having the foregoing characteristics, which enables the user to adjust the mechanical advantage of the device. A further object of the present disclosure is to provide vents in a sleeve or protective sleeve to prevent the rope from generating excessive heat during a descent. The sleeve or protective sleeve can be manufactured through additive manufacturing, injection molding, milling, or other manufacturing techniques.

Briefly, one embodiment of the present disclosure comprises an improved descent controller for lowering a load along a rope from an elevated position to a relatively lower position. The controller comprises a housing having a friction cylinder or capstan of a length adapted to receive a plurality of turns of the rope wrapped therearound. The housing has an upper end portion and a lower end portion, with top and bottom end plates attached respectively adjacent the upper end portion and spaced from the lower end portion of the housing. The lower end portion has a transverse through aperture connecting to a generally longitudinal aperture. The top end plate has a portion thereof overhanging the cylinder and defining radial slots sized to loosely receive the rope. The housing defines a longitudinal counterbore intersecting the transverse through aperture at the housing lower end portion. An elongated aperture extends transversely through the housing upper end portion and intersects the counterbore.

A plunger comprises a bottom portion disposed within the housing counterbore and a top portion disposed adjacent the housing top plate. The plunger may include an intermediate portion having a diameter between the diameter of the bottom and top portions. The bottom portion of the plunger extends below the lower end plate and defines diametrically therethrough a downwardly narrowing tapered slot. The tapered slot defines an enlarged end adapted to freely admit the rope and tapers from the enlarged end to a relatively constricted end of a width sufficient for gripping the rope.

A bias member is disposed within the counterbore and between the plunger bottom portion and the housing. The bias member urges the plunger toward a position for wedging the rope in the narrow end of the tapered slot. An outer sleeve is secured to the plunger top portion for use in sliding the plunger against the force of the biasing spring to release the rope from the narrow end of the tapered slot. The sleeve defines a housing substantially enclosing the plunger, spring, friction cylinder and the rope wrapped therearound. The lower portion of the sleeve may also include a longitudinally extending slot therein of sufficient width for freely receiving the rope. Means are provided on the lower end of the housing for engagement with a load support. The descent controller supports a load on the rope and, upon sliding movement of the sleeve, provides for a controlled descent of descent controller and the supported load along the rope.

In another aspect of the disclosure, the controller can be secured at an elevated position and actuated at that point to lower a rope-supported load. The present disclosure provides a descent controller that substantially encloses the working components. Additionally, the descent controller can use parts that are robust in construction while requiring only a fraction of the length of some known controllers.

BRIEF DESCRIPTION OF THE DRAWINGS

The novel features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying drawings, wherein:

FIG. 1 is a perspective view illustrating use of an embodiment of a descent controller.

FIG. 2 is side view, partly in phantom and partly in section, of an embodiment of a descent controller.

FIG. 3 is a side view showing the descent controller of FIG. 2 in a different orientation.

DETAILED DESCRIPTION

Figure 4A:
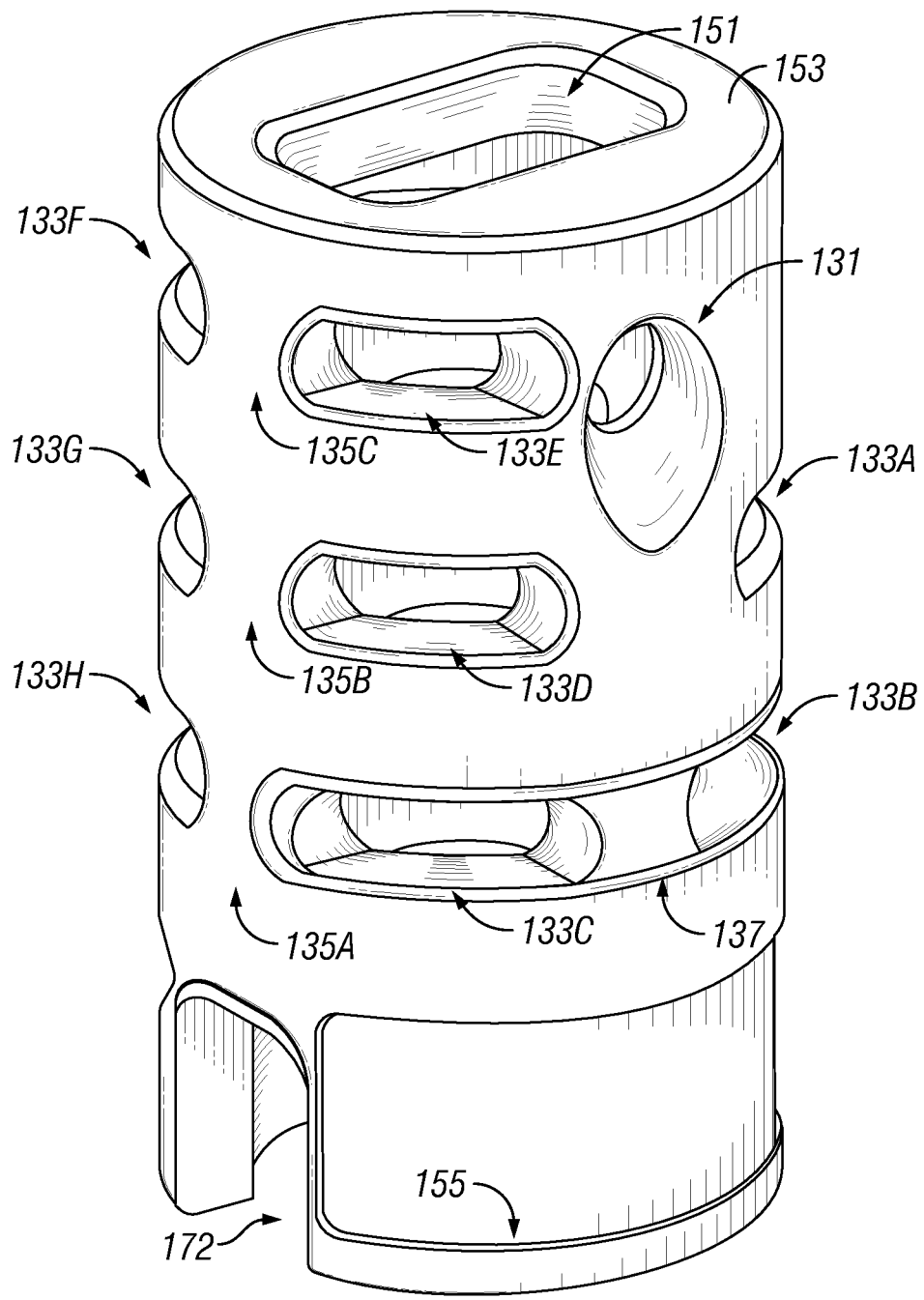
FIG. 4A is an upper perspective view of an embodiment of a vented sleeve.

One embodiment of a descent controller 10 of the present disclosure is shown in FIGS. 1, 2 and 3. The descent controller comprises a housing 12 including a longitudinally oriented capstan 14 such as a cylinder shaft or drum about which a length of rope or line 16 is wound. The number of turns of rope is the principal determinate of the capstan ratio or mechanical advantage enabling the user or load to descend slowly along the fixed rope as the rope hangs from the elevated point. A user can change the number of turns of rope wound around the capstan to change the mechanical advantage and thereby the descent speed. The rope is secured at one end at an elevated point (not shown) above the ground, and hangs downwardly to the ground or a lower platform (not shown). The descent controller is mounted on the rope to enable the descent controller and user or a load to descend slowly and controllably along the fixed length of rope from the elevated point to the lower point, whether the ground or a platform.

In at least one embodiment, the user and the rope may be coupled together through a belt 20 or other safely device such as a vest or backpack. The controller includes means for selectively gripping the rope to slow or prevent descent and for selectively releasing the rope to provide for a controlled descent. In a first extreme position or deadman position, the controller grips the rope tightly, preventing descent. In some embodiments, the opposite extreme position comprises a complete release position wherein the rope is released at a rate limited by the weight of the load and the number of turns of rope wrapped around the capstan or friction cylinder. Between the extreme positions, the rope can be released at a user-controlled rate.

The housing of the descent controller 10 includes a top plate 44 adjacent an upper end portion and a bottom portion comprising a bottom plate 46 adjacent a lower end of the capstan 14. Juxtaposed with the bottom portion of the housing is means for receiving a coupling device 48, strap, supporting rope, hook, loop, carabiner or the like for engaging and supporting a load suspension structure or harness. The housing can be an integral structure.

The housing lower end portion defines a transverse through aperture 54 connecting to a longitudinal aperture 52, each sized for freely receiving a portion of the rope. The top plate 44 includes at least one rope receiving guide notch defined therein for receiving an inserted portion of the rope.

The housing defines a longitudinal counterbore 56 substantially concentric with a center axis and intersecting the transverse through aperture 54 at the housing lower end portion. Advantageously, the housing defines a diametrically smaller counterbore in the lower end portion and a diametrically larger counterbore in the intermediate and upper portions.

The housing intermediate and upper portions define at least one longitudinally elongated aperture 50 intersecting the counterbore. Advantageously, the housing defines a pair of diametrically opposed, longitudinally elongated apertures 50 and at least one of the apertures extends transversely through the wall of the housing and intersects the counterbore.

A plunger (partially illustrated in phantom) comprises a bottom portion disposed within the housing counterbore and a top portion overlying the housing top plate. The plunger includes an intermediate portion that may have a diameter between the bottom and top portions. The plunger intermediate portion defines a diametrical aperture therethrough. The plunger can be integral to the housing.

The housing is secured to the plunger by at least one stop pin 36 extending through the plunger diametrical aperture and the housing longitudinally elongated aperture 50. The stop pin and longitudinally elongated aperture combine to limit the plunger to only axial movement between the extreme raised and lowered positions.

In one embodiment, the bottom portion of the plunger extends below the lower end plate and defines diametrically therethrough a narrowing tapered slot (not illustrated) having a generally teardrop shape. The slot tapers from an enlarged end that loosely receives the rope to a narrow or gripping end that frictionally grips the rope. A rope passing through the open end of the slot moves freely through the slot. However, the rope is tightly gripped and restrained by the narrower end of the slot. The housing transverse aperture 54 positively positions the rope in the slot. The transverse aperture 54 receives the rope and allows the rope to pass freely through the enlarged end of the tapered slot when the plunger is in a lowered position, as well as receiving the rope to force or jam the rope into the narrow end of the tapered slot when the plunger is in its upper position.

While a downwardly narrowing tapered slot is disclosed, it should be understood that other slots having different configurations in which the rope is loosely received in one portion and restrained from passage in another portion are possible and all such configurations are encompassed by the disclosure. For example, the slot may have an enlarged central portion connecting opposing narrower portions in a general diamond shape.

The rope is inserted through the transverse through aperture 54 and longitudinal aperture 52, wound in a number of coils or turns about the capstan or friction cylinder 14 between the bottom and top plates and disposed through the top plate guide notch.

A bias member functions to urge the plunger toward its rope gripping or deadman position wherein the narrower end of the slot is aligned with the housing transverse through aperture 54. In this position the slot narrow end restrains the rope from passing through the descent controller. The bias member can be, for example, a coil spring 32 disposed between an interior wall 38 of the counterbore and an outer surface 40 of the bottom portion of the plunger. Preferably, a lower end of the spring is supported by a thrust shoulder 34 in the housing lower end portion and an opposing upper end of the spring is supported by a plunger thrust shoulder defined at the intersection of the plunger bottom and intermediate portions.

A sleeve or housing 30 is secured to the plunger top portion. As shown in FIGS. 2 and 3, the sleeve extends in surrounding covering relation with the plunger intermediate and lower portions, spring, capstan, rope turns, the housing upper and lower plates and some of the housing lower end portion. Advantageously, the sleeve is removably secured to the plunger top portion by, for example, ball detents 26 or threaded fasteners so that the sleeve can be removed to facilitate disassembly and reassembly of the descent controller.

In one embodiment, the sleeve 30 can have a knurled, grooved or roughened outer surface to enable a user to readily grip the housing surface without slipping, to actuate the plunger. Adjacent its lower edge, the sleeve is provided with a longitudinally extending peripheral notch that aligns with the housing transverse aperture and through which the rope loosely extends.

Because the sleeve is rotationally secured to the plunger and the plunger is rotationally secured to the housing by, for example, the stop pin, there is no tendency for the sleeve and/or plunger to rotate with respect to the capstan cylinder in this embodiment, thereby minimizing binding or jamming of the rope during descent.

In the event that a user completely releases the sleeve, e.g. a deadman fall, the spring will bias the plunger to a raised or second position so that the transverse aperture will jam the rope in the upper tapered end of the slot to prevent or retard further descent. The device can thus provide for a stop or a controlled descent as desired under deadman conditions.

Figure 4B:
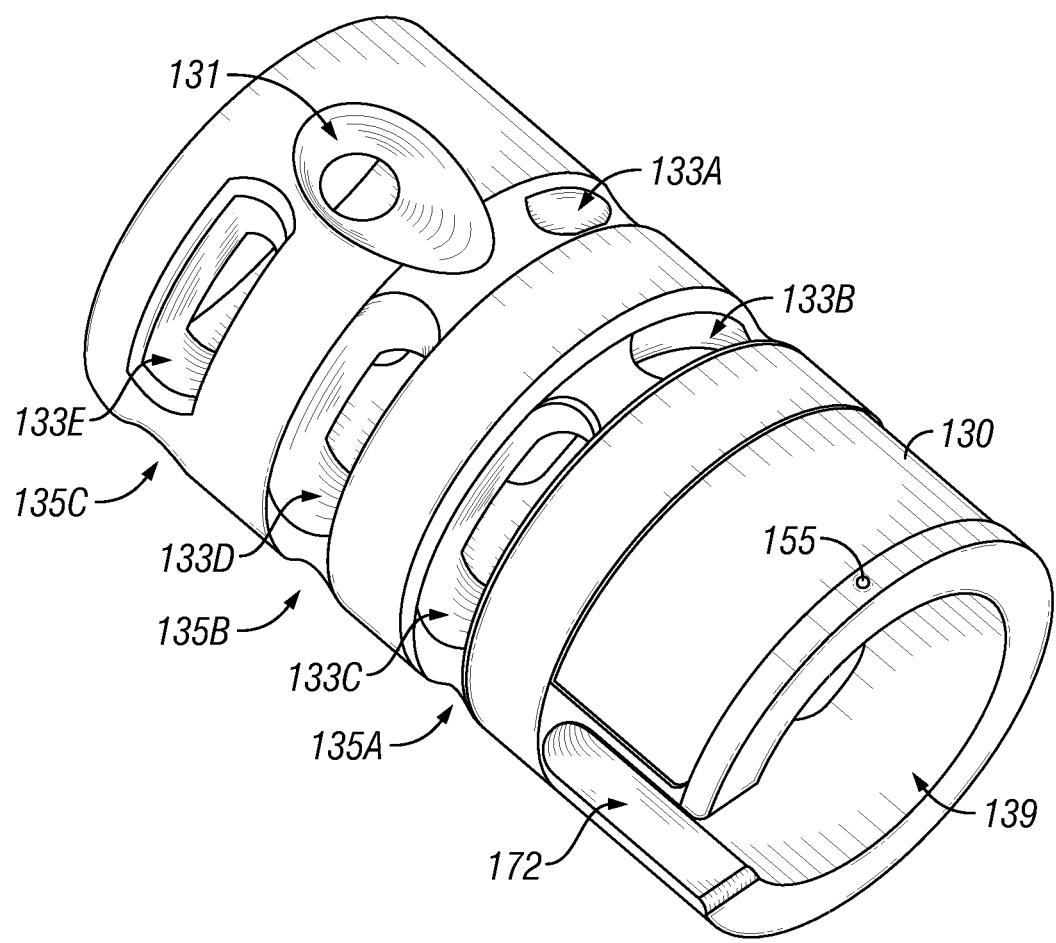
FIG. 4B is a lower perspective view of an embodiment of a vented sleeve.

FIG. 4A is an upper perspective view of an embodiment of a vented sleeve 130. Such a vented sleeve could be used, for example, with the descent controller described with reference to FIGS. 1-3. FIG. 4B a lower perspective view of an embodiment of a vented sleeve 130. With reference to FIGS. 4A and 4B, the vented sleeve 130 can be manufactured from a heat resistant material such as but not limited to plastic, heat resistive nylon, glass filled nylon, plastic based composite materials, plastic like composite materials, or other heat resistant materials capable of additive (three-dimensional printing) manufacturing, milling, and/or injection molding. In at least one embodiment, the vented sleeve 130 may be manufactured out of plastic, heat resistant nylon, glass filled nylon, metals such as aluminum or titanium, and/or composites such as carbon fiber or other similar and/or like compounds The vented sleeve 130 may also be sized and/or shaped to house a descent controller within it.

For example, the vented sleeve 130, in at least one embodiment, can be a cylinder, or elongated cylinder with a top or upper section, a side or enclosing section, and a bottom or lower section. The side or enclosing section may be coupled to and/or manufactured as part of the top and/or bottom section. In at least one example, the vented sleeve 130 in a first position may house or enclose the housing and/or plunger of the descent controller.

The vented sleeve 130 can have at least one button aperture 131. The button aperture 131 can have an angled lip that can surround the button aperture 131. The button aperture 131 can in at least one example be substantially closer to the top than the bottom of the vented sleeve 130 along a portion of the side section. The side section may also have one or more vents 133A, 133B, 133C, 133D, 133E, and/or 133F (collectively 133). The vent(s) 133 in at least one example, are substantially oval with the semi-major axis extending parallel with the top and bottom of the vented sleeve 130. In at least one embodiment, the vent(s) 133 are placed along the circumference of the vented sleeve 130. When there are two or more vent(s) 133, there can be a separation support 135A, 135B, 135C, 135D, 135E, and/or 135F (collectively 135). In at least one example, there may also be partial separation support(s) 137. The partial separation support(s) 137 can have a depth that is less than the separation support 135. In at least one embodiment, the partial separation support(s) 137 is at least one half the depth of the separation support 135, but no more than two-thirds the depth of the separation support 135. The vented sleeve 130, can have an extending peripheral notch 172 that can align with portions of a descent controller to allow for a rope move freely through the descent controller. The bottom of the vented sleeve 130 can have an engaging aperture 139 to allow for a descent controller to be inserted into and/or within the vented sleeve 130. The vented sleeve 130 can be coupled to a descent controller by a pin placed through a securing aperture 155. The top 153 of the vented sleeve 130 can have a rope aperture 151 that allows for a rope to pass through the vented sleeve 130 from a descent controller.

Figure 5:
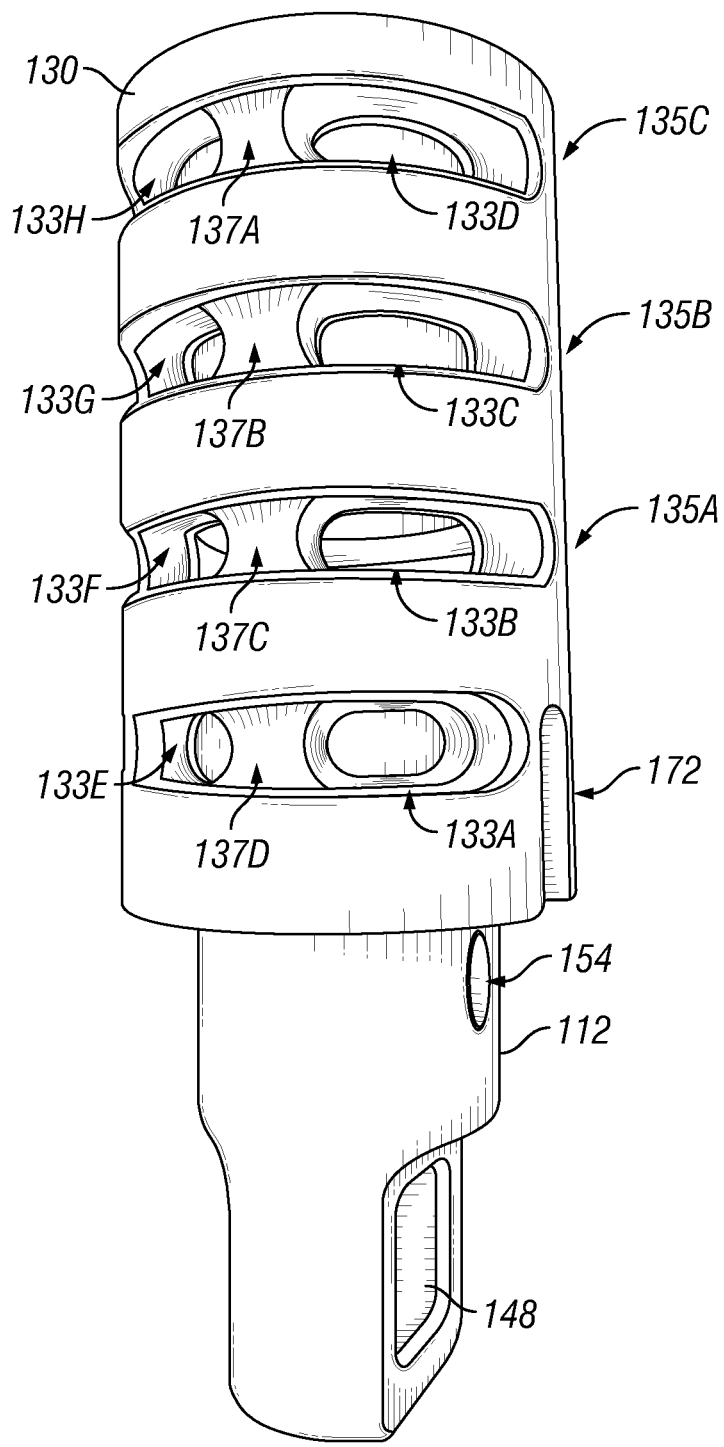
FIG. 5 is a perspective assembly view of an embodiment of a vented sleeve together with a housing.

FIG. 5 is a perspective assembly view of an embodiment of a vented sleeve together with a housing. The vented sleeve 130 can have one or more vent(s) 133A, 133B, 133C, 133D, 133E, 133F, 133G, and/or 13311 (collectively 133). The vented sleeve 130 can have separation support(s) 135A, 135B, and/or 135C (collectively 135). The separation support(s) 135 can provide structural integrity to the vented sleeve 130. For example, the vented sleeve 130 may have a single set of separation supports 135 vertically along the outer circumference of the vented sleeve 130 opposite the button aperture 131. In other examples, the vented sleeve 130 may have more than one set of separation supports 135 vertically along the circumference of the vented sleeve 130.

In at least one embodiment, the vented sleeve 130 has two sets of separation supports 135 arranged vertically along the circumference of the vented sleeve 130. In at least one example, the vented sleeve 130 may also have partial separation support(s) 137A, 137B, 137C, and/or 137D (collectively 137). The partial separation support(s) 137 would have a depth that is less than the depth (from the outer surface of the vented sleeve 130, to the inner surface of the vented sleeve 130) of the separation support(s) 135.

The vented sleeve 130 can have an extending peripheral notch 172 that can align with aperture 154 (a rope travel aperture) that allows for a rope to pass through the vented sleeve 130 and a descent controller. The aperture 154 may be disposed within a housing 112. The housing 112 can receive a plunger (not illustrated) that can be operated with a resistance device to serve as a lock and/or brake for the rope. Juxtaposed with the bottom portion of the housing is means for receiving a coupling device 148 for attaching a connection, such as, but not limited to a strap, supporting rope, hook, loop, carabiner or the like for engaging and supporting a load suspension structure or harness. The coupling device 148 and housing 112 can be, but is not required to be, an integral structure as shown in FIG. 5.

Figure 6:
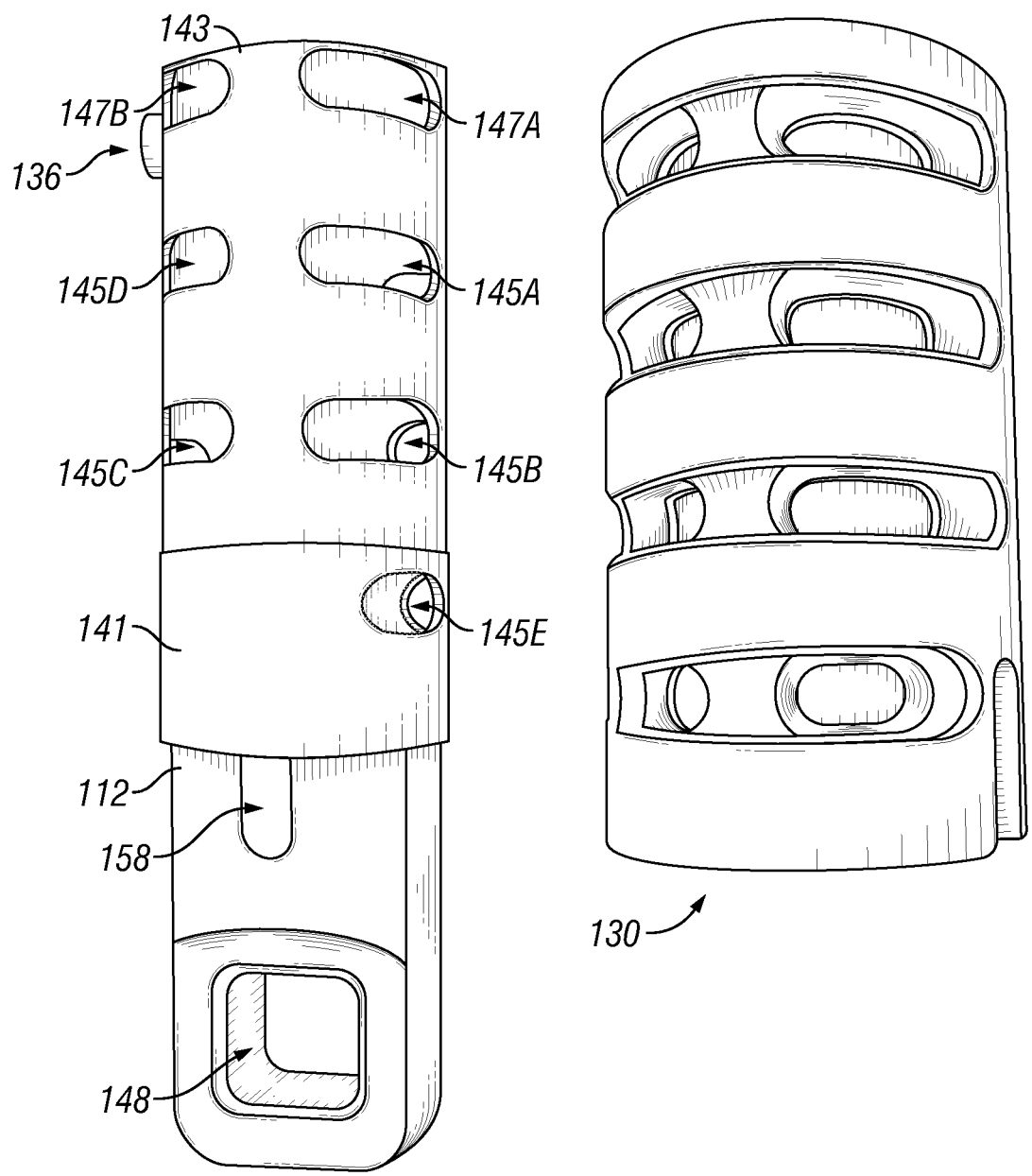
FIG. 6 is a side perspective view of an embodiment of a housing and protective sleeve assembly and a vented sleeve.

FIG. 6 is a side perspective view of an embodiment of a housing and protective sleeve assembly and a vented sleeve. The protective sleeve 141 (inner sleeve) can have an upper section 143 that has at least one button aperture (not shown) that allows for operation of the securing button 136. The securing button 136 can pass through the protective sleeve 141 (inner sleeve) and the vented sleeve 130 (outer sleeve). The protective sleeve 141 can also have venting apertures 145A, 145B, 145C, 145D, and/or 145E (collectively 145). The protective sleeve 141 may be manufactured out of plastic, heat resistant nylon, glass filled nylon, metals such as aluminum or titanium, and/or composites such as carbon fiber, plastic based composite materials, metallic based composite materials, or other similar and/or like compounds. The upper section 143 of the protective sleeve 141 (inner vented sleeve) may also have upper venting aperture(s) 147A and/or 147B. The aperture 158 that allows for a rope to pass through the vented sleeve 130 and a descent controller may be disposed within a housing 112. The housing 112 can receive a plunger (not illustrated) which can be operated with a resistance device, such as, but not limited to a spring, coil, magnets, and/or other devices capable of resistance, to serve as a lock and/or brake for the rope. Juxtaposed with the bottom portion of the housing is means for receiving means for receiving a coupling device 148 for attaching a connection such as a strap, supporting rope, hook, loop, carabiner or the like for engaging and supporting a load suspension structure or harness like that shown in FIG. 1. The housing 112 and the receiving means 148 can be an integral structure.

Figure 7A:
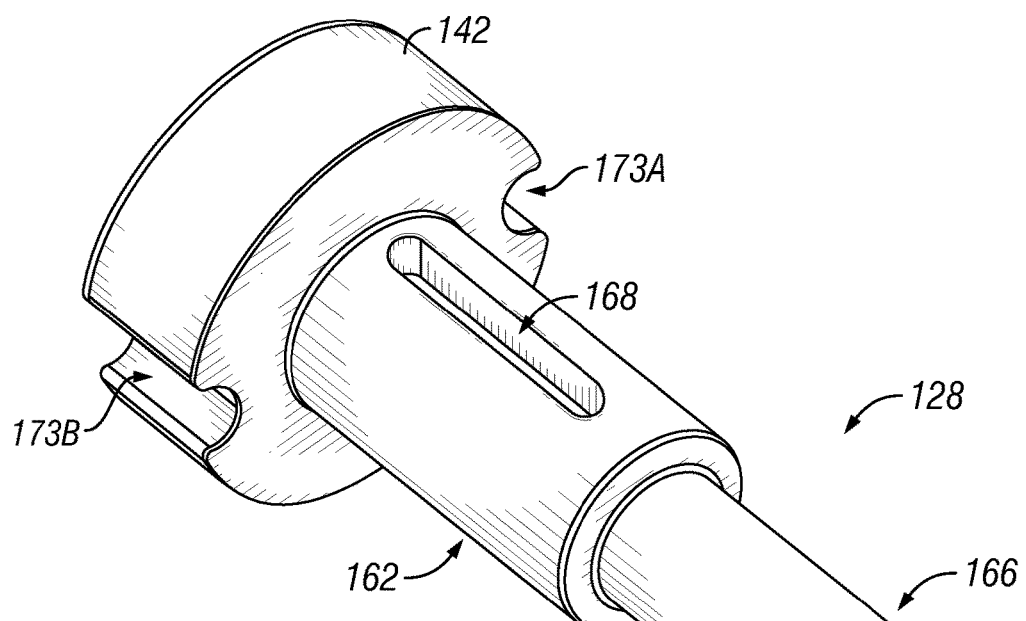
FIG. 7A is a perspective view of an embodiment of a plunger.
Figure 7B:
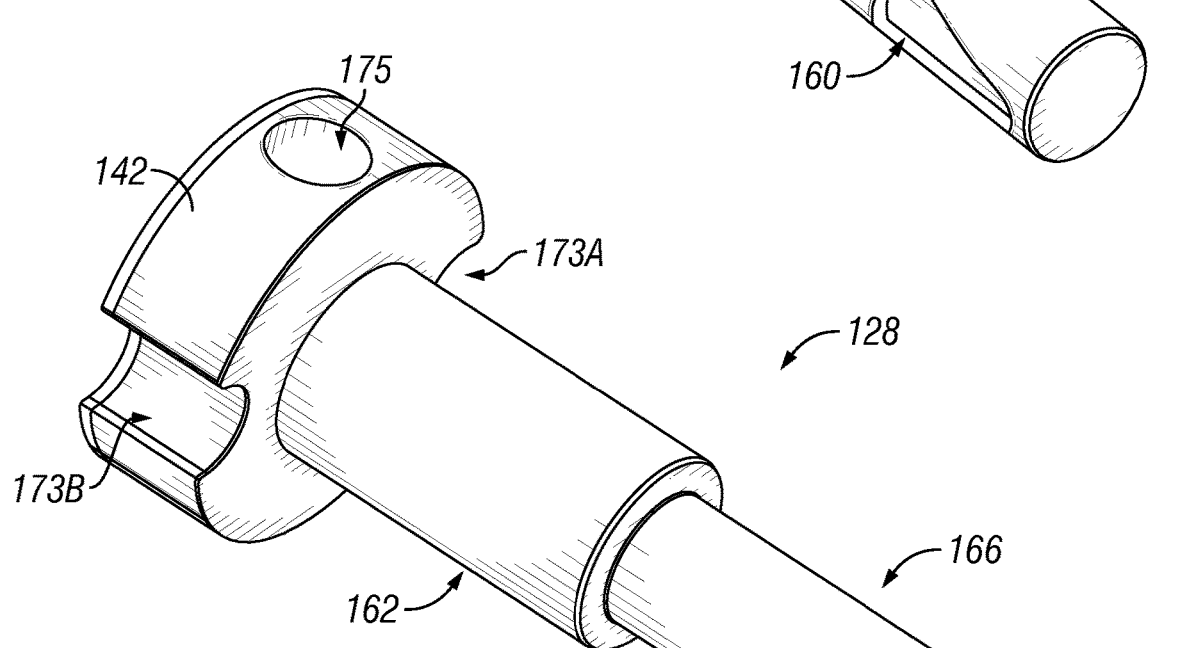
FIG. 7B is a perspective view of the plunger of FIG. 7A showing the opposite side.

FIGS. 7A and 7B are perspective views of an embodiment of a plunger 128. With respect to FIGS. 7A and 7B, the plunger 128 can have an upper portion 142, an intermediate portion 162, and/or a bottom or lower portion 166. In at least one example, the upper portion is at least two or three times larger in diameter than the intermediate portion 162, the diameter of which is larger than the lower portion 166. The upper portion 142 can have one or more rope slot(s) 173A and/or 173B (collectively 173). The rope slot(s) 173 are apertures along the circumference of the upper portion 142 that allow a rope to pass through the plunger 128 and/or the upper portion 142. The upper portion 142 may also have a securing button aperture 175 that is sized for receiving a securing button, and/or a biasing or resistive device to correspond with the securing button. The intermediate portion 162 may have a securing slot 168. The securing slot 168 can be an elongated slot for receiving a securing pinto limit the travel of the plunger 128 against a biasing means or resistance device. For example, the securing slot 168 in combination with a securing pin (not illustrated) can prevent the plunger 128 from overextending, or pushing the plunger 128 past the housing (see FIGS. 8A and 8B) and potentially cutting the rope (not illustrated). In at least one example, the securing slot 168 has a depth less than the diameter of the intermediate portion 162. Lower portion 166 can also have a narrowing tapered aperture or slot 160 that allows for the passage of a rope and/or securing line through it.

Figure 8A:
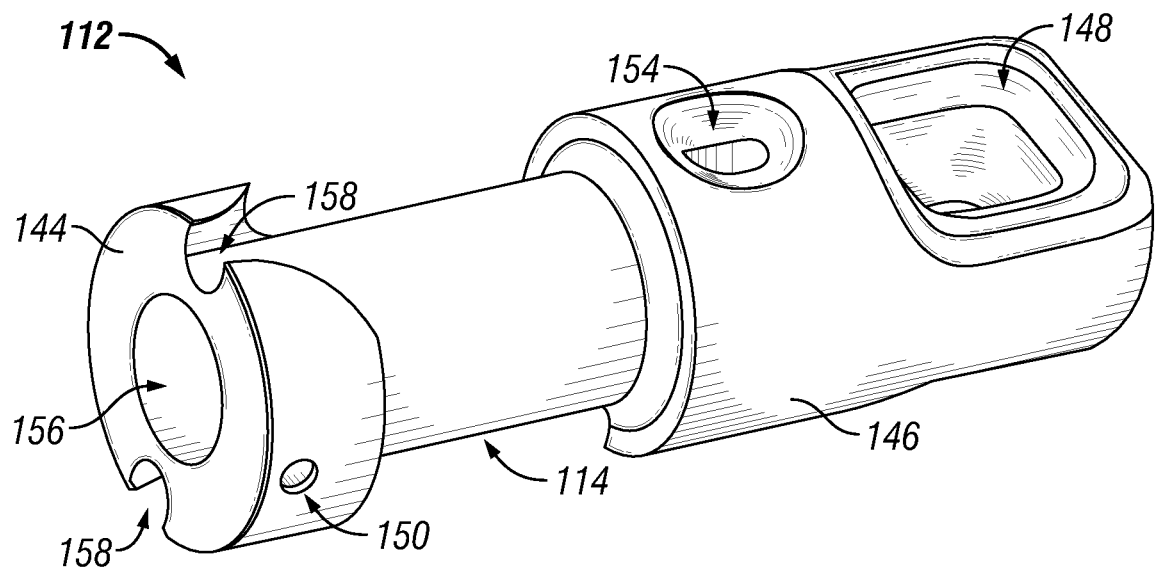
FIG. 8A is a perspective view of an embodiment of a housing.
Figure 8B:
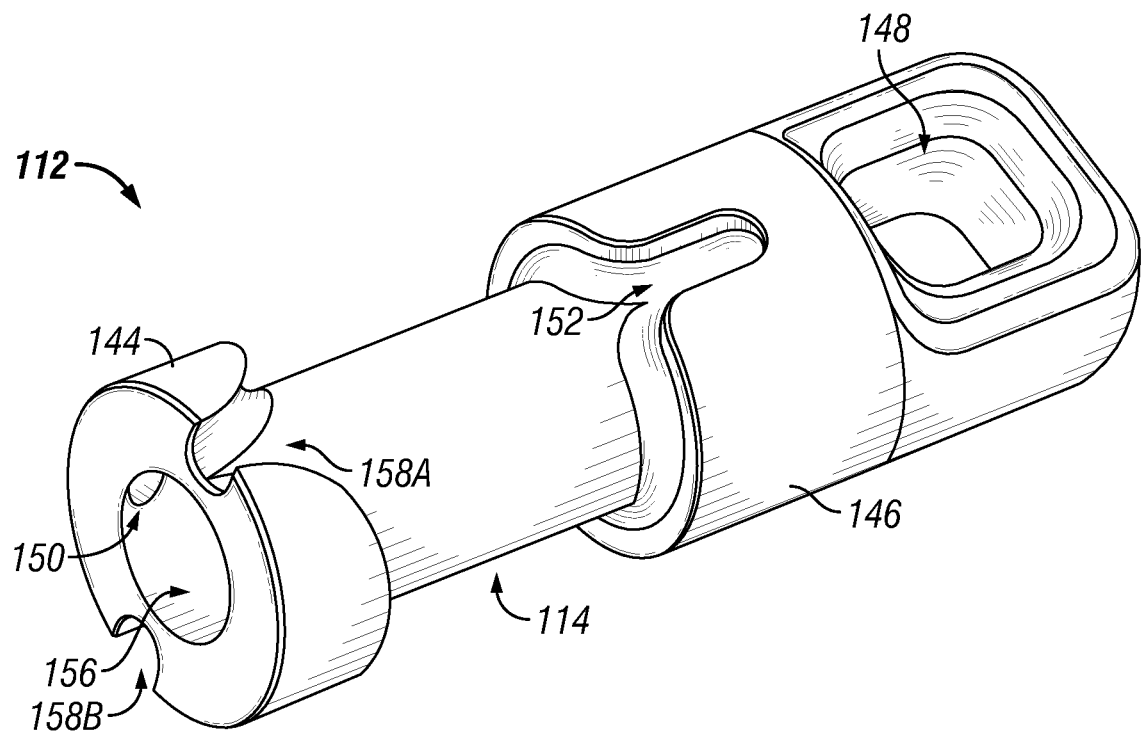
FIG. 8B is a perspective view of the housing of FIG. 8A showing the opposite side.

FIGS. 8A and 8B are perspective views of an embodiment of a housing 112. With regards to FIGS. 8A and 8B, the housing 112 has a capstan 114. In at least one example, the capstan 114 can be an intermediate portion between the top or upper portion 144, and the bottom or lower portion 146. The capstan 114, in at least one embodiment, is a smooth surface that allows for a rope and/or line to be coiled and/or lined around it, to create a mechanical advantage. In some examples, the upper portion 144 and the lower portion 146 are of the same diameter that is greater than the diameter of the capstan 114. The upper portion 144, may have at least one rope aperture 158A and/or 158B (collectively 158) that allow for the passage of a rope or line from the capstan 114 to a plunger (not illustrated). The rope aperture 158 can be configured to receive and allow the passage or traversal of a rope or line. The upper portion 144 may also have a securing pin aperture 150 that intersects the upper portion 144 and is sized and/or configured to receive a securing pin (not illustrated). The securing pin can be utilized to prevent the plunger from exceeding its desired travel distance. In one embodiment, the securing pin aperture 150 in combination with a securing pin (not illustrated) penetrating the securing slot 168 of the plunger 128 illustrated in FIGS. 7A and 7B, can prevent the plunger 128 from extending to point of breaking, cutting and/or severing a rope (not illustrated).

The upper portion 144 and the capstan 114 may be configured to have a counterbore 156 that is concentric with a center axis that passes through both the upper portion 144 and the capstan 114. In at least one example, the counterbore 156 receives the plunger and/or a biasing, resistance and/or resistive device. The housing 112 and the plunger (illustrated in FIGS. 7A and 7B) move towards one another with the plunger being engaged by a biasing, resistance and/or resistive device. In at least one examples, the biasing, resistance and/or resistive device is a spring. The lower portion 146 may have a transverse through aperture 154 connecting to a longitudinal aperture 152, each sized for freely receiving a portion of the rope. The longitudinal aperture 152 may also be coupled and/or allow for a rope to be received by the capstan 114. In at least one example, a rope or line may be placed through the transverse through aperture 154, that is coupled to the longitudinal aperture 152, allowing the rope or line to be coiled around the capstan 114 and then traversing the rope aperture 158. In at least one example the bore defined by the transverse through aperture 154, and longitudinal aperture 152, along with the capstan 114 and the rope aperture(s) 158 are all smooth to allow a rope or line to pass through and/or around them without friction, or an increase in friction or resistance. The lower portion 146 may also have a receiving means 148 or securing loop that allows for, ropes, hooks, loops, carabiners or the like to be utilized for engaging and supporting a load suspension structure or harness by the housing 112.

Figure 9A:
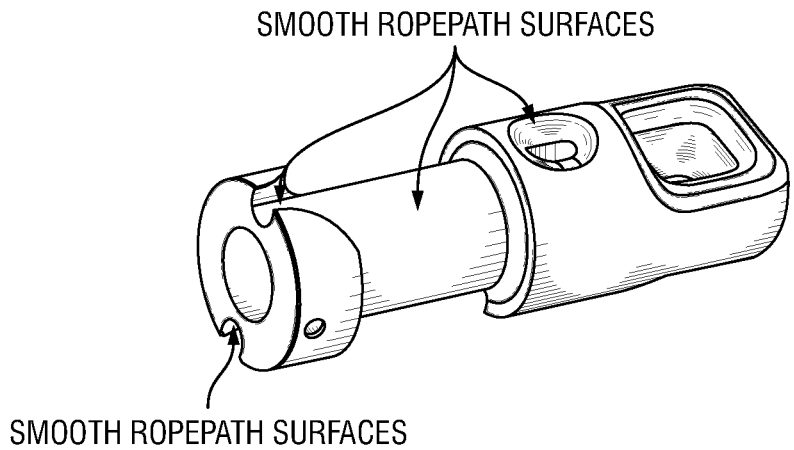
FIGS. 9A and 9B are perspective views of an embodiment of a housing illustrating rope path surfaces.
Figure 9B:
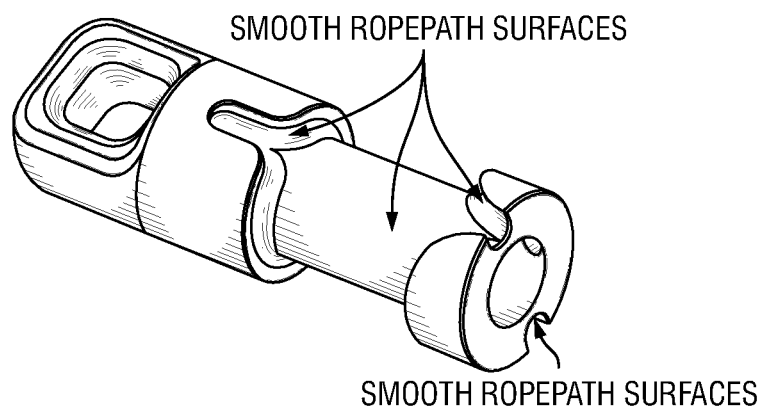
Figure 9C:
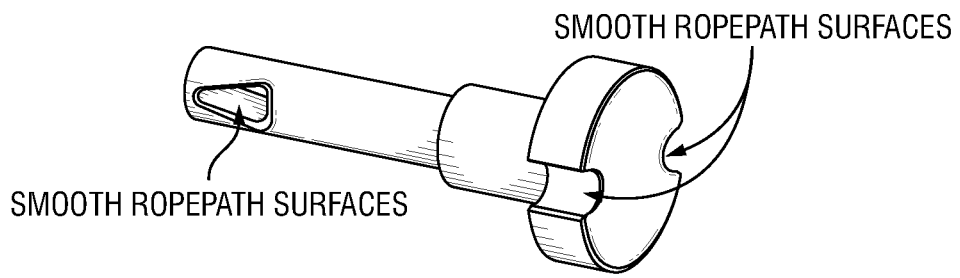
FIG. 9C is a perspective view of an embodiment of a plunger illustrating rope path surfaces.

FIGS. 9A, 9B and 9C are perspective views of an embodiment of a housing and a plunger illustrating the surfaces that allow a rope to traverse the housing and plunger. The surfaces that interact with the rope can be smooth to prevent higher friction coefficients, and more heat. As the rope passes over the surfaces, it may deposit its coating or composition material on to the surface. The deposit of material causes a generation of material on material friction that quickly generates significant heat of the housing, plunger, and rope. A traditional sleeve has no ventilation, causing heat to continually build over long rope deployments. As the temperature rises the rope may begin to show signs of charring or burn marks that can cause concern for the user. However, the vented sleeve as illustrated in FIGS. 4A and 4B allows the heat generated to be released in a manner that prevents the rope from charring or having burn marks.

In any embodiment, the portions of the device in contact with the rope, such as aperture edges, can be polished or chamfered or rounded to reduce cutting of or damage to the rope. The rope path surfaces as referenced allow for a nonlinear rope paths are surprisingly influential to rope wear and rope capacity. Preferably, the surfaces in these areas are smoothly flowing rope paths comprising inner radii of more than 1.2 times the rope radius, external radii of more than 3 times the rope radius and rope contact areas with no high spots or ledges. Ropes such as VECTRAN, 12 strand braided rope, available from The Cortland Companies and having a diameter of about 5 mm can be used with a descent controller having the preferred smoothly flowing rope paths. Surfaces in these areas that have an inner radius of less than 1 times the rope radius or an external radius of less than 3 times the rope radius or a high area or ledge may decrease the rope ultimate yield strength or carrying capacity by as much as 50 percent.

Figure 10A:
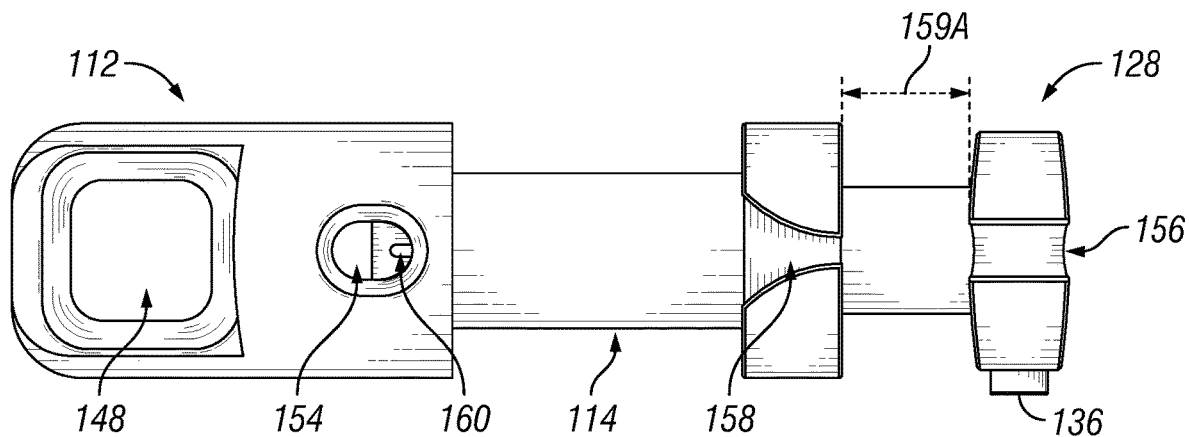
FIG. 10A is a side assembly view of an embodiment of a housing and plunger in a first position.
Figure 10B:
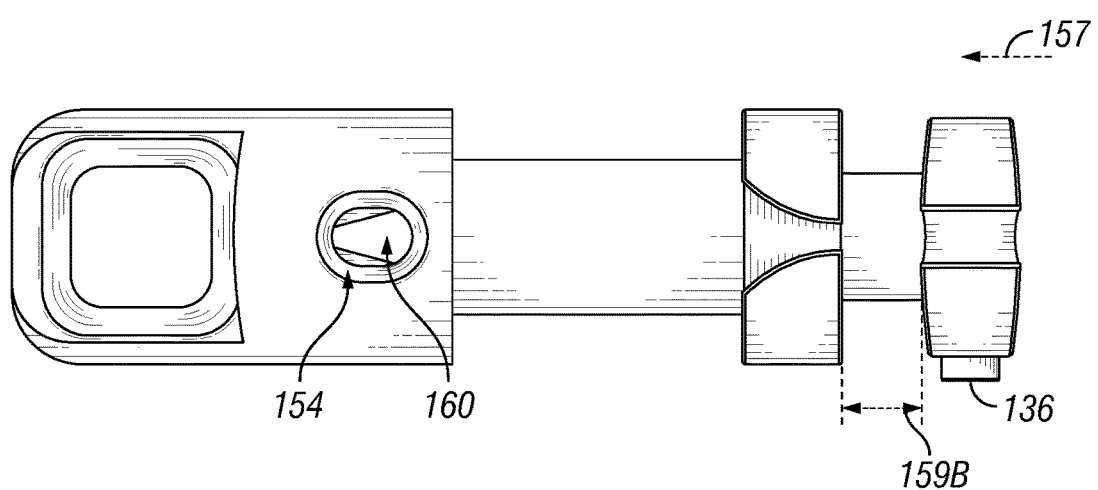
FIG. 10B is a side assembly view of an embodiment of a housing and plunger in a second position.

FIGS. 10A and 10B are side views of an embodiment of a housing and plunger assembly that illustrate the operation of the housing 112 and the plunger 128. The housing can have a longitudinally oriented capstan 114 such as a cylinder shaft or drum about which a length of rope or line is wound. The housing 112 has a section that allows a plunger 128 to be inserted within the housing 112 and be longitudly operated (depressed) 157 against a resistance device or biasing means (not illustrated). The resistance device may be a spring or other device that would return the plunger to a first position after being operated to a second position. The distance between the top portion of the plunger 128 and the housing 112 can be a first distance 159A, while in a depressed state the distance between the top portion of the plunger 128 and the housing 112 is reduced to a second distance 159B. With the housing 112 and the plunger 128 at a first distance 159A the aperture 154 and a narrowing tapered slot 160 having a generally teardrop shape, are not aligned. The slot tapers from an enlarged end (seen in FIG. 10B) that loosely receives the rope to a narrow or gripping end (see in FIG. 10A) that frictionally grips the rope. A rope passing through the open end of the slot moves freely through the slot. However, the rope is tightly gripped and restrained by the narrower end of the slot. When the housing 112 and the plunger 128 are at a second distance 159B apart, the aperture 154 and the narrowing tapered slot 160 are aligned to allow a rope to pass through them. The rope (not illustrated) may pass through a capstan opening 158, and/or a plunger opening 156.

Figure 11:
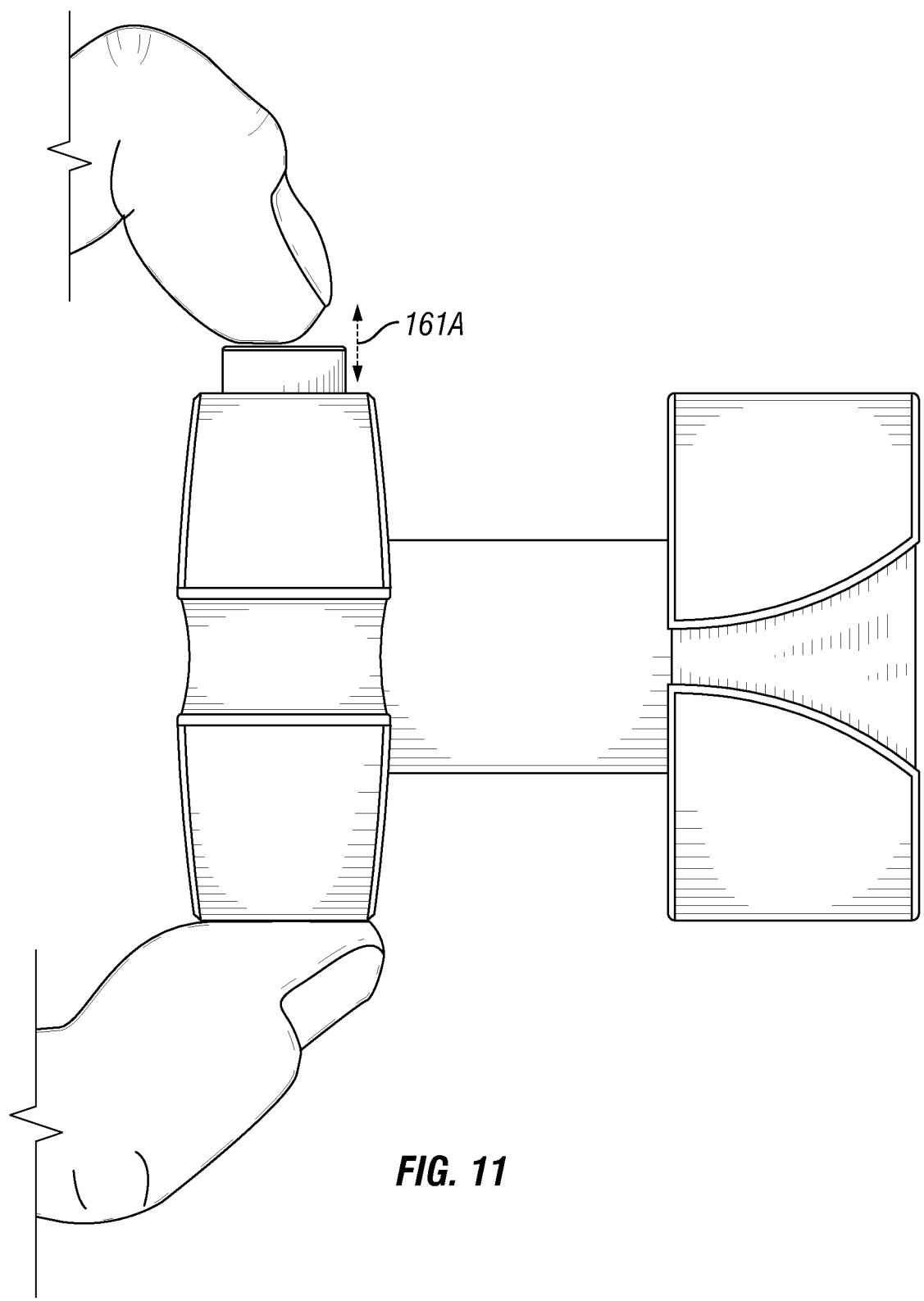
FIG. 11 is a side view of an embodiment of a visible portion of a plunger after insertion into a housing illustrating securing button operation.

FIG. 11 is a side view of an embodiment of a visible portion of a plunger after insertion into a housing illustrating the operation of the securing button 136. The securing button 136 can be used to secure the plunger 128 and/or housing 112 with a protective sleeve and/or vented sleeve. When the securing button 136 is depressed 161A within the plunger 128 it allows for the plunger 128 to be removed from a vented sleeve (not illustrated). In at least one embodiment, when the securing button 136 is depressed, the plunger and/or housing may be removed from the vented sleeve.

Figure 12A:
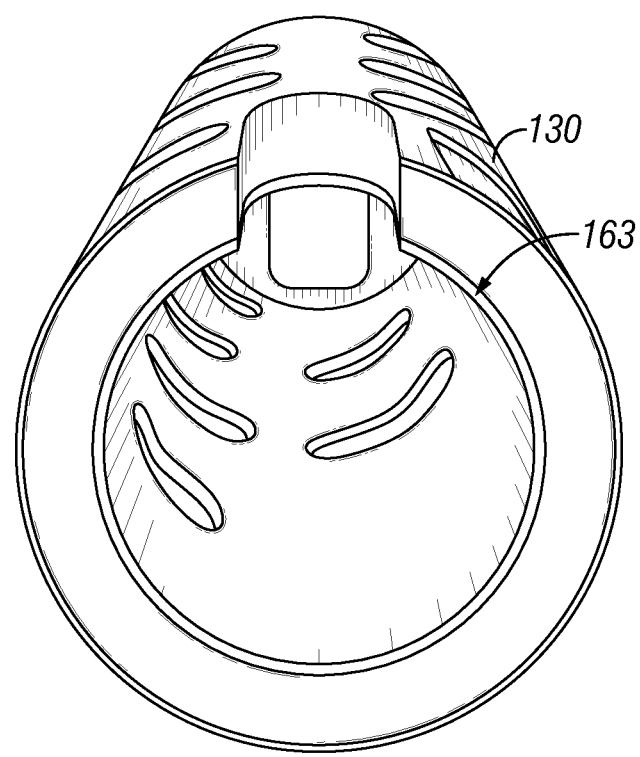
FIGS. 12A and 12B are perspective assembly views of the ends of an embodiment of a vented sleeve and protective sleeve.
Figure 12B:
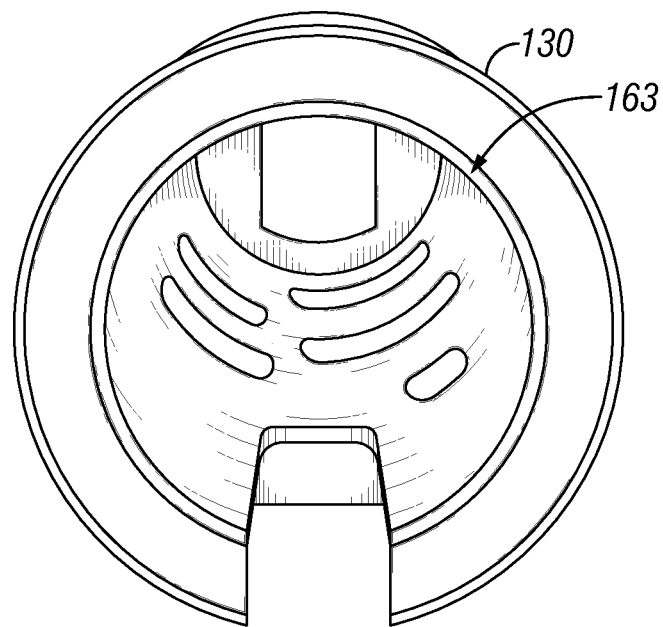

FIGS. 12A and 12B are perspective assembly views of the ends of a vented sleeve 130 and a protective sleeve 163. The protective sleeve 163 can be housed within the vented sleeve 130. In at least one example, the protective sleeve 163 can be secured to the vented sleeve 130 via a pin that passes through a securing aperture (not illustrated). The protective sleeve 163 can have vent(s) that align with the vent(s) 133A, 133B, 133C, and/or 133D of the vented sleeve 130.

Figure 13:
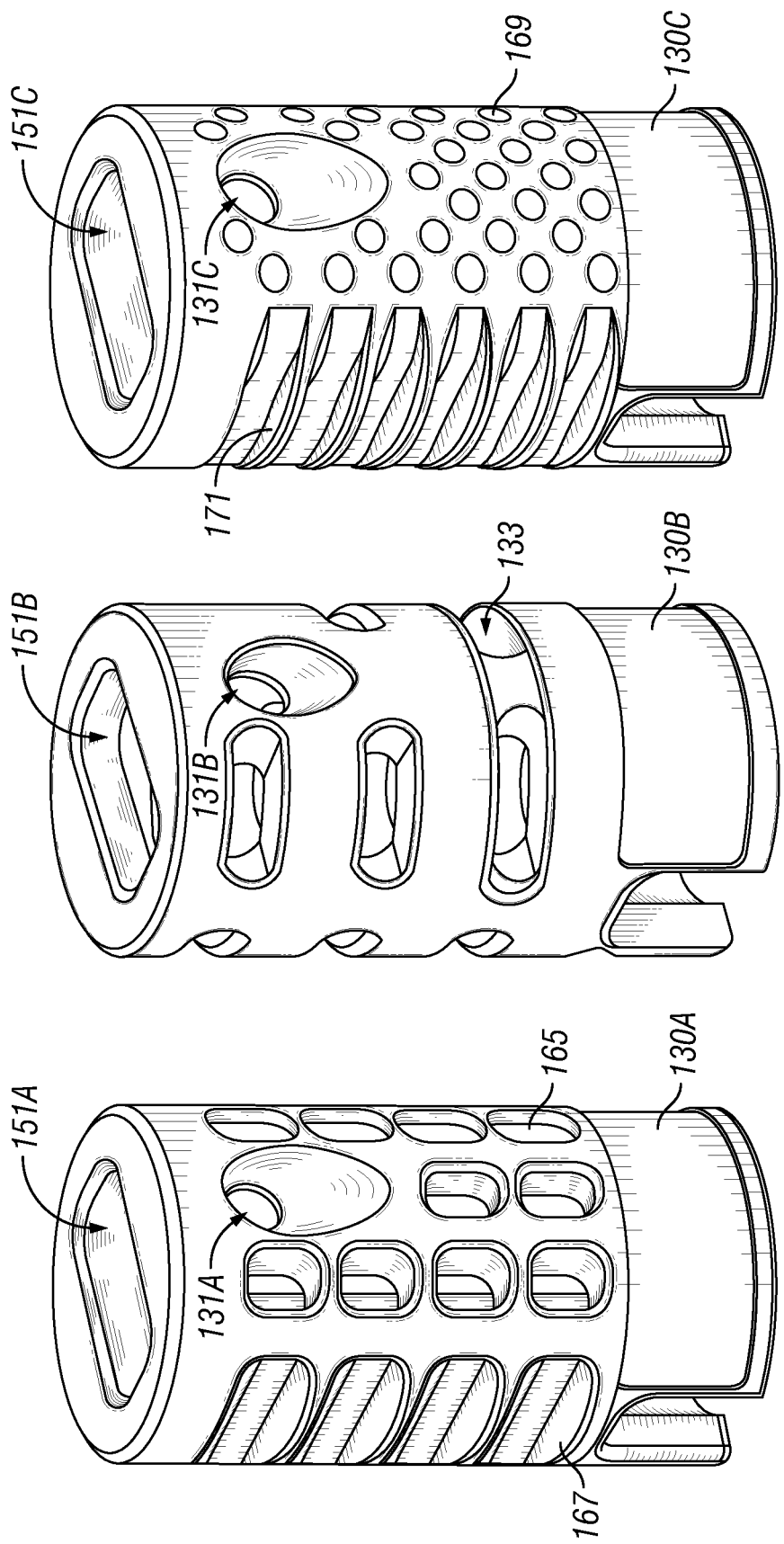
FIG. 13 is a perspective view of various embodiments of vented sleeves with alternative vent dimensions and shapes.

FIG. 13 a perspective view of various embodiments of vented sleeves with alternative vent dimensions and shapes. The first vented sleeve 130A can have a substantially square vent 165 in combination with a substantially rectangular vent 167. The second vented sleeve 130B can have substantially oval or rectangular vent(s) 133. The third vented sleeve 130C can have substantially round vent(s) 169 in combination with a substantially rectangular or oval vent(s) 171. Each of the vented sleeve 130, can have a securing button aperture 131A, 131B, and/or 131C, as well as a rope aperture 151A, 151B, and/or 151C. The vented sleeve in at least one example is utilized to provide insulation from the movement of a rope and/or safety to a user from heat built up from friction. The insulation would prevent excess heat from building up at a user's hands during a descent. The vents in the vented sleeve and/or the protective sleeve allow for air flow through a descent controller, and in particular, to the capstan where the rope is coiled and creates friction during a descent. Safety is also increased with the vented sleeve and/or protective sleeve as both are vented to allow air flow to a rope, but also prevent a user from directly contacting the rope during a descent. Accordingly, the vents of the vented sleeve and/or protective sleeve, can be sized and/or shaped in any manner that allows for air flow through the area the rope traverses in a manner to cool the rope during a descent. The vented sleeve and/or protective sleeve, may also have additional sleeves placed and/or configured in a similar manner with similar venting to allow for additional insulation and/or safety of a user.

Alternatively, for lowering an unconscious person or other load along a rope from an elevated position to a lowered position, the load can be secured to the loop end of the rope and the descent controller secured to a fixed mounting support by attaching the strap 18 thereto. An operator at the position of the fixed descent controller can reach the sleeve to actuate the controller to control the descent of the load in the harness. The free end of the rope feeds through the controller as the load descends.

A further alternative use of a descent controller embodying the present disclosure, is for controlling the descent of workstations, such as a bosun's chair, while the rider is working on a vertical surface. The user secures the descent controller to the bosun's chair and descends to a working position. At the working position the sleeve is released, thereby stopping the descent, and enabling the user to perform a task at the working position. When the task at that location is finished, the user can descend to a lower position and continue the work. The descent is controlled by actuating the sleeve of the descent controller to provide for a controlled descent. For additional safety, the user also conventionally employs a separate, secured safety rope (not shown), to prevent accidental descent or catch the user and prevent a fall.

The foregoing descent controller provides a user controllable means for a person located above the ground or floor to descend thereto on a rope. Applications include, but are not limited to, egress from overhead crane cabs, forklift or stockpicker cabs, and the buckets on high-lift utility vehicles. In addition, the device may be used for the evacuation of buildings, bridges, structures, platforms, ships, or aircraft where the descent distance is sufficient to cause injury if the user jumps without a control device. Another application is for the rescue of persons trapped in a building by fire, stranded on a ledge or a mountain, or in similar hazardous situations. Police special weapons teams and armed forces personnel can use the device effectively for controlled descent from buildings, ledges, mountains, aircraft and other elevated positions.

The present disclosure finds particular but not necessarily exclusive utility in safety escape systems. Such an escape system includes a descent controller in association with a safety rope and a supporting harness such as, for example, a harness of the type disclosed and claimed in U.S. Pat. No. 5,070,692, issued Dec. 10, 1991. At one end, the rope is provided with a loop or other device to enable the rope to be secured at an elevated position. The free end of the rope is housed in a container. The rope container, descent controller, and harness are packaged in a kit containing appropriate instructions. In use, such as for a descent from a scaffold or lift truck platform, the kit is opened and the loop end of the rope is secured to a fixture at the elevated location. The rope packet is lowered so that the rope extends from the fixture to the ground. The user dons the harness, steps off of the platform and actuates the descent controller so that the descent controller and user descend along the rope to the ground.

While certain illustrative embodiments have been shown in the drawings and described above in considerable detail, it should be understood that there is no intention to limit the disclosure to the specific forms disclosed. On the contrary, the intention is to cover all modifications, alternative constructions, equivalents and uses falling within the spirit and scope of the disclosure as expressed in the appended claims.

While this disclosure has been particularly shown and described with reference to preferred embodiments, it will be understood by those skilled in the art that various changes in form and detail may be made therein without departing from the spirit and scope of the disclosure. The inventors expect skilled artisans to employ such variations as appropriate, and the inventors intend the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

I claim:

1. An apparatus for descent control comprising:
a housing comprising a longitudinal capstan portion, the longitudinal capstan portion defining a longitudinal counterbore therein;
a plunger disposed within the longitudinal counterbore for movement between a rope releasing position and a rope braking position;
a biasing member within the longitudinal counterbore for biasing the plunger toward the rope braking position; and
a vented sleeve partially enclosing the housing, the vented sleeve comprising a plurality of vents configured to provide an air flow to the longitudinal capstan portion of the housing,
wherein the plurality of vents are spaced apart around a perimeter of the vented sleeve such that a first of the plurality of vents is disposed between sixty and one-hundred-twenty degrees around an axis of the longitudinal capstan portion from a second of the plurality of vents.

2. The apparatus of claim 1, wherein the vented sleeve further comprises an outer vented sleeve, and an inner vented sleeve.

3. The apparatus of claim 2, wherein the outer vented sleeve is manufactured from a plastic based composite material.

4. The apparatus of claim 2, wherein the inner vented sleeve is manufactured from a metallic based composite material.

5. The apparatus of claim 1, wherein the plurality of vents are rectangular.

6. The apparatus of claim 1, wherein the plurality of vents are circular.

7. The apparatus of claim 1, wherein the plurality of vents are square.

8. The apparatus of claim 1, wherein the vented sleeve has at least one rope aperture at a first end of the vented sleeve separate from the plurality of vents.

9. The apparatus of claim 1, wherein the vented sleeve has at least one securing aperture at a first end of the vented sleeve, wherein the at least one securing aperture is transverse to the longitudinal capstan portion.

10. The apparatus of claim 1, wherein the vented sleeve has at least one rope travel aperture on a top of the vented sleeve separate from the plurality of vents.

11. A controller for selectively gripping and releasing a rope comprising:
- a housing having a longitudinal capstan portion that defines a longitudinal counterbore therein;
- a plunger partially disposed within the longitudinal counterbore for movement between a first position and a second position;
- a biasing member disposed within the longitudinal counterbore for urging the plunger toward the first position; and
- a vented inner sleeve and a vented outer sleeve, wherein both vented sleeves allow for receiving the plunger and a portion of the housing.

12. The controller of claim 11, wherein the vented inner sleeve allows for a release of heat resulting from movements of the rope against the housing.

13. The controller of claim 11, wherein the vented inner sleeve further comprises at least one vent that is adjacent to at least one vent of the vented outer sleeve.

14. The controller of claim 13, wherein each of the at least one vents is arranged horizontally along a circumference of the vented inner sleeve and a circumference of the vented outer sleeve.

15. A vented sleeve for use with a rope operated device comprising:
- a cylindrical body comprised of a wall having an inner surface and an outer surface;
- a plurality of vents passing from the outer surface to the inner surface, wherein the plurality of vents are enclosed by the cylindrical body;
- a top at a first end of the vented sleeve, wherein the top defines a rope aperture; and
- a second end opposing the first end, the second end being open to allow the rope operated device to be at least partially inserted within the vented sleeve,
- wherein the vented sleeve is configured to allow a user to control the rope operated device with a sliding movement of the vented sleeve when the rope operated device is at least partially inserted within the vented sleeve.

16. The vented sleeve of claim 15, wherein the plurality of vents comprises at least three vents.

17. The vented sleeve of claim 15, wherein the vented sleeve further comprises at least one separation support between the at least two vents.

18. The vented sleeve of claim 17, wherein the at least one separation support has a depth less than that between the outer surface and the inner surface of the cylindrical body.

19. The vented sleeve of claim 15, wherein the vented sleeve further comprises at least one partial separation support between the at least two vents.

20. The vented sleeve of claim 17, wherein the vented sleeve further comprises at least one partial separation support along the cylindrical body, wherein the depth of the partial separation support is less than the depth of the at least one separation support.

* * * * *